United States Patent
Bullied et al.

(10) Patent No.: US 12,145,198 B2
(45) Date of Patent: Nov. 19, 2024

(54) COMMERCIAL SCALE CASTING PROCESS INCLUDING OPTIMIZATION VIA MULTI-FIDELITY OPTIMIZATION

(71) Applicant: Raytheon Technologies Corporation, Farmington, CT (US)

(72) Inventors: Steven J. Bullied, Pomfret, CT (US); Andrew J. Boyne, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 114 days.

(21) Appl. No.: 16/920,686

(22) Filed: Jul. 4, 2020

(65) Prior Publication Data
US 2021/0001399 A1    Jan. 7, 2021

Related U.S. Application Data

(60) Provisional application No. 62/977,493, filed on Feb. 17, 2020, provisional application No. 62/949,111, (Continued)

(51) Int. Cl.
*G06F 30/23* (2020.01)
*B22D 46/00* (2006.01)
(Continued)

(52) U.S. Cl.
CPC ............ *B22D 46/00* (2013.01); *G06F 30/20* (2020.01); *G06F 30/23* (2020.01); *G06F 2113/22* (2020.01)

(58) Field of Classification Search
CPC ......... B22D 46/00; G06F 30/20; G06F 30/23; G06F 2113/22; G06F 30/25; G06F 30/27;
(Continued)

(56) References Cited

U.S. PATENT DOCUMENTS

| | | | | |
|---|---|---|---|---|
| 5,486,995 A | * | 1/1996 | Krist | G05B 13/00 |
| | | | | 700/29 |
| 5,841,669 A | * | 11/1998 | Purvis | B22D 46/00 |
| | | | | 702/179 |

(Continued)

FOREIGN PATENT DOCUMENTS

| | | |
|---|---|---|
| EP | 2390025 A1 | 11/2011 |
| WO | WO-9615866 A1 * 5/1996 | ............... B22C 1/18 |

(Continued)

OTHER PUBLICATIONS

Jana, S., O. Kättlitz, F. Hediger, J. Jakumeit, and J. Aguilar. "Predictions of misruns using three-phase coupled mold-filling and solidification simulations in low pressure turbine (LPT) blades." In IOP Conference Series: Materials Science and Engineering, vol. 33, No. IOP Publishing, 2012. 9 pages (Year: 2012).*

(Continued)

*Primary Examiner* — Michael Edward Cocchi
(74) *Attorney, Agent, or Firm* — Bachman & LaPointe, P.C.

(57) ABSTRACT

A process includes: a first casting modelling stage producing resulting casting parameters; a second casting modelling stage performed using the resulting casting parameters of the first casting modelling stage and of higher fidelity than the first casting modelling stage; in parallel with the second casting modelling stage, a casting trial using the resulting casting parameters of the first casting modelling stage; and evaluating the casting trial.

19 Claims, 9 Drawing Sheets

Related U.S. Application Data filed on Dec. 17, 2019, provisional application No. 62/871,005, filed on Jul. 5, 2019.

(51) Int. Cl.
*G06F 30/20* (2020.01)
*G06F 113/22* (2020.01)

(58) Field of Classification Search
CPC ...... G06F 30/28; G06F 30/367; G06F 30/398; B22C 9/04
See application file for complete search history.

(56) References Cited

U.S. PATENT DOCUMENTS

| | | | |
|---|---|---|---|
| 5,868,194 A | 2/1999 | Horwood | |
| 6,298,898 B1 | 10/2001 | Mahadeva et al. | |
| 8,655,476 B2 | 2/2014 | Wang et al. | |
| 2010/0185312 A1* | 7/2010 | Wang | G06F 30/20 703/7 |
| 2012/0232685 A1* | 9/2012 | Wang | B22D 46/00 700/98 |
| 2018/0095450 A1 | 4/2018 | Lappas et al. | |

FOREIGN PATENT DOCUMENTS

| | | | | |
|---|---|---|---|---|
| WO | WO-2007026552 A1 * | 3/2007 | ............ | B22C 7/023 |
| WO | 2019/055538 A1 | 3/2019 | | |

OTHER PUBLICATIONS

Carlson, Kent D., Shouzhu Qu, and Christoph Beckermann. "Feeding of high-nickel alloy castings." Metallurgical and Materials Transactions B 36, No. 6 (2005): 843-856 (Year: 2005).*

Ohnaka, I. "How to solve complex problems in foundry plants-future of casting simulation." In IOP Conference Series: Materials Science and Engineering, vol. 84, No. 1, p. 012034. IOP Publishing, 2015 (Year: 2015).*

Korzekwa, D. A. "Truchas-a multi-physics tool for casting simulation." International Journal of Cast Metals Research 22, No. 1-4 (2009): 187-191. (Year: 2009).*

Khalil Kabiri-Bamoradian, Die and Die Casting Machine Computer Simulations: Modeling, Meshing, Boundary Conditions, and Analysis Procedures, Center for Die Casting, The Ohio State University, 2010, 122 pages (Year: 2010).*

Manjunath Patel, G. C., P. Krishna, and M. B. Parappagoudar. "Modelling in squeeze casting process-present state and future perspectives." Advances in Automobile Engineering 4, No. 1 (2015): 1-9 (Year: 2015).*

European Office Action dated Dec. 7, 2021 for European Patent Application No. 20158088.3.

Maodong Kang et al., "Prediction of Microporosity in Complex Thin-Wall Castings with the Dimensionless Niyama Criterion", Materials, May 7, 2013, pp. 1789-1802, Jun. 2013, MDPI, Basel, Switzerland.

M. Wu et al., "Numerical Simulation of the Casting Process of Titanium Tooth Crowns and Bridges", Journal of Materials Science: Materials in Medicine, Jan. 1, 2001, pp. 485-490, vol. 12, No. 6, Springer, New York, New York.

European Search Report dated Jun. 5, 2020 for European Patent Application No. 20158088.3.

European Search Report dated Jul. 3, 2024 for European Patent Application No. 24167757.4.

* cited by examiner

COMMERCIAL SCALE CASTING PROCESS INCLUDING OPTIMIZATION VIA MULTI-FIDELITY OPTIMIZATION

CROSS-REFERENCE TO RELATED APPLICATIONS

Benefit is claimed of U.S. Patent Application No. 62/871,005, filed Jul. 5, 2019, U.S. Patent Application No. 62/949,111, filed Dec. 17, 2019, and U.S. Patent Application No. 62/977,493, filed Feb. 17, 2020, all entitled "Commercial Scale Casting Process including Optimization Via Multi-Fidelity Optimization", the disclosures of which are incorporated by reference herein in their entireties as if set forth at length.

BACKGROUND

The disclosure relates to metal casting. More particularly, the disclosure relates to design of casting processes and hardware including issues of part and mold configuration.

Traditional process flow and design for investment casting of single crystal turbine hardware involves relying on a preexisting knowledge base of casting hardware to determine process design which includes mold design and casting parameters. For example, even with a given design of the ultimate part (e.g., a solid model of the finished metallic part) there are many features and process steps to be determined to enable commercial scale casting of acceptable quality components. Features to design and optimize include gating, orientation and position of part cavities, venting, seed configuration, and the like. There are other issues of metal flow rates, part withdrawal rate from furnace, temperature profiles, and the like.

After initial design of part/mold/process, current state of the art flow would perform a high fidelity FEA computer simulation to validate the process solution. This would involve investing time and budget in designing the entire process and validating with a single point answer that would take several weeks

SUMMARY

One aspect of the disclosure involves a process comprising: a first casting modelling stage producing resulting casting parameters; a second casting modelling stage performed using the resulting casting parameters of the first casting modelling stage and of higher fidelity than the first casting modelling stage; in parallel with (i.e., at the same time as) the second casting modelling stage, a casting trial using the resulting casting parameters of the first casting modelling stage; and evaluating the casting trial.

A further embodiment of any of the foregoing embodiments may additionally and/or alternatively include the first casting modelling stage including a low (or lower) fidelity simulation and the second casting stage including a high (or higher) fidelity simulation.

A further embodiment of any of the foregoing embodiments may additionally and/or alternatively include the first casting modelling stage including multiple runs of the low fidelity simulation and the second casting stage including only a single run of the high fidelity simulation.

A further embodiment of any of the foregoing embodiments may additionally and/or alternatively include: the first casting modelling stage including an evaluation after the low fidelity simulation with a negative result of the evaluation forking back to before the low fidelity simulation; and the second casting stage including only a single run of the high fidelity simulation.

A further embodiment of any of the foregoing embodiments may additionally and/or alternatively include, in response to the evaluating yielding an unsatisfactory result, the process forking back to within the first casting modelling stage.

A further embodiment of any of the foregoing embodiments may additionally and/or alternatively include, the forking back being to a point dependent on the collated casting trial, second casting modelling stage, and first casting modelling stage.

A further embodiment of any of the foregoing embodiments may additionally and/or alternatively include, the forking back causing the first casting modelling stage to run with an expanded process parameter range relative to the prior run.

A further embodiment of any of the foregoing embodiments may additionally and/or alternatively include, the expanded process parameter range being created algorithmically by a rules-based modification of a prior run process parameter range.

A further embodiment of any of the foregoing embodiments may additionally and/or alternatively include, the rules-based modification of a prior run process parameter range expanding the process parameter range based on a magnitude of the unsatisfactory result and one or more associated process parameter sensitivities.

A further embodiment of any of the foregoing embodiments may additionally and/or alternatively include the forking back being to a point dependent on the nature of the unsatisfactory result.

A further embodiment of any of the foregoing embodiments may additionally and/or alternatively include: the first casting modelling stage including running a solidification model in response to a first said unsatisfactory result, the forking back being to a point after the solidification model; and in response to a second said unsatisfactory result, the forking back being to a point before the solidification model.

A further embodiment of any of the foregoing embodiments may additionally and/or alternatively include: the first casting modelling stage including running a solidification model, the first casting modelling stage including a determination of variables and regions of interest, and the forking back being to a point after the solidification model but at or before the determination of variables and regions of interest.

A further embodiment of any of the foregoing embodiments may additionally and/or alternatively include the first casting modelling stage including running a solidification model, the first casting modelling stage including an optimization, and sensitivity analysis of defect risk, and the forking back being to a point after the solidification model but at or before the optimization and sensitivity analysis of defect risk.

A further embodiment of any of the foregoing embodiments may additionally and/or alternatively include, in response to the evaluating yielding a satisfactory result, performing commercial scale production of castings (or casting a plurality of parts) using the casting parameters of the satisfactory result. In embodiments, the parts are gas turbine engine components.

A further embodiment of any of the foregoing embodiments may additionally and/or alternatively include, relative to the second casting modeling stage, the first casting modelling stage involving one or more of: coarser mesh; simplistic approximation of gating features; omission of casting core; simpler furnace model; lower part count per mold; simplification of part features; omission of part features; smaller run time; and fewer iterations.

A further embodiment of any of the foregoing embodiments may additionally and/or alternatively include, relative to the second casting modeling stage, the first casting modelling stage involving one or both of: coarser mesh; and simplistic approximation of gating features.

A further embodiment of any of the foregoing embodiments may additionally and/or alternatively include, relative to the second casting modeling stage, the first casting modelling stage involving simplistic approximation of gating features.

A further embodiment of any of the foregoing embodiments may additionally and/or alternatively include the evaluating comprising comparing results of the second casting modelling stage with results of the casting trial. In embodiments, the results of the casting trial comprise parameters of a casted part.

A further embodiment of any of the foregoing embodiments may additionally and/or alternatively include the comparing comprising determining presence in the casting trial of defects not predicted by the second casting modelling stage.

A further embodiment of any of the foregoing embodiments may additionally and/or alternatively include the first casting modelling stage and the second casting modelling stage being performed using one or a connected group of computer systems.

A further embodiment of any of the foregoing embodiments may additionally and/or alternatively include: the one or a connected group of computer systems comprising one or more servers and one or more workstations; and the one or more servers and one or more workstations having respective scripting language interpreters running respective scripts. The scripts are configured to: compute simulation parameters corresponding to experimental points spanning a process parameter range; execute simulations according to the computed simulation parameters; analyze the relative risk of defects predicted by each executed simulation; and perform an optimization and sensitivity analysis of defect risk in order to determine optimized casting process parameters.

Another aspect of the disclosure involves one or a connected group of computer systems running software configured to: run a first casting modelling stage producing resulting casting parameters; run a second casting modelling stage performed using the resulting casting parameters of the first casting modelling stage and of higher fidelity than the first casting modelling stage; and evaluate a casting trial using the resulting casting parameters of the first casting modelling stage.

A further embodiment of any of the foregoing embodiments may additionally and/or alternatively include the software being configured to: run the casting trial in parallel with the second casting modelling stage.

A further embodiment of any of the foregoing embodiments may additionally and/or alternatively include the evaluating including comparing the results of the casting trial with results of the second casting modelling stage.

A further embodiment of any of the foregoing embodiments may additionally and/or alternatively include a scripting language interpreter running scripts configured to: compute simulation parameters corresponding to experimental points spanning a process parameter range; execute simulations according to the computed simulation parameters; analyze the relative risk of defects predicted by each executed simulation; and perform an optimization and sensitivity analysis of defect risk in order to determine optimized casting process parameters.

A further embodiment of any of the foregoing embodiments may additionally and/or alternatively include the one or a connected group of computer systems including: one or more servers; and one or more workstations networked with the one or more servers.

A further embodiment of any of the foregoing embodiments may additionally and/or alternatively include a scripting language interpreter running scripts configured to: compute simulation parameters corresponding to experimental points spanning a process parameter range; execute simulations according to the computed simulation parameters; analyze the relative risk of defects predicted by each executed simulation; and perform an optimization and sensitivity analysis of defect risk in order to determine optimized casting process parameters.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
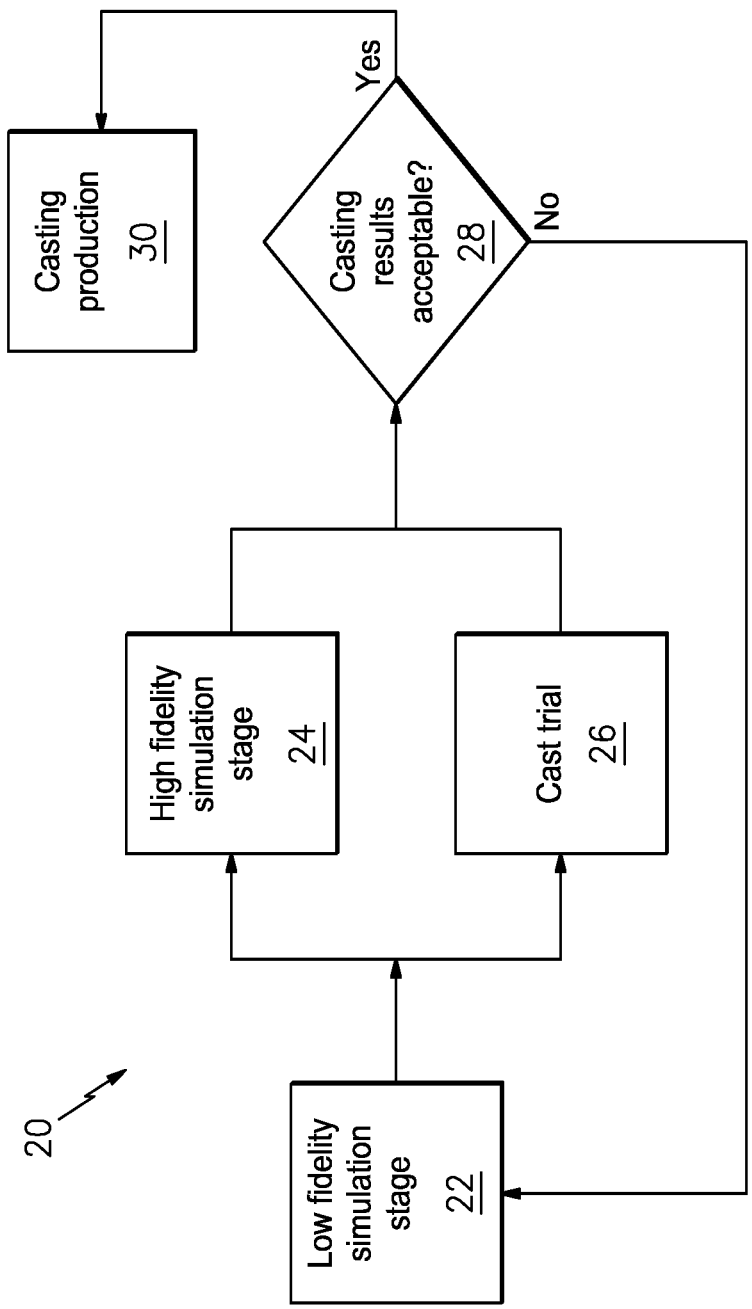
FIG. 1 is a block diagram of a two stage process.
Figure 2:
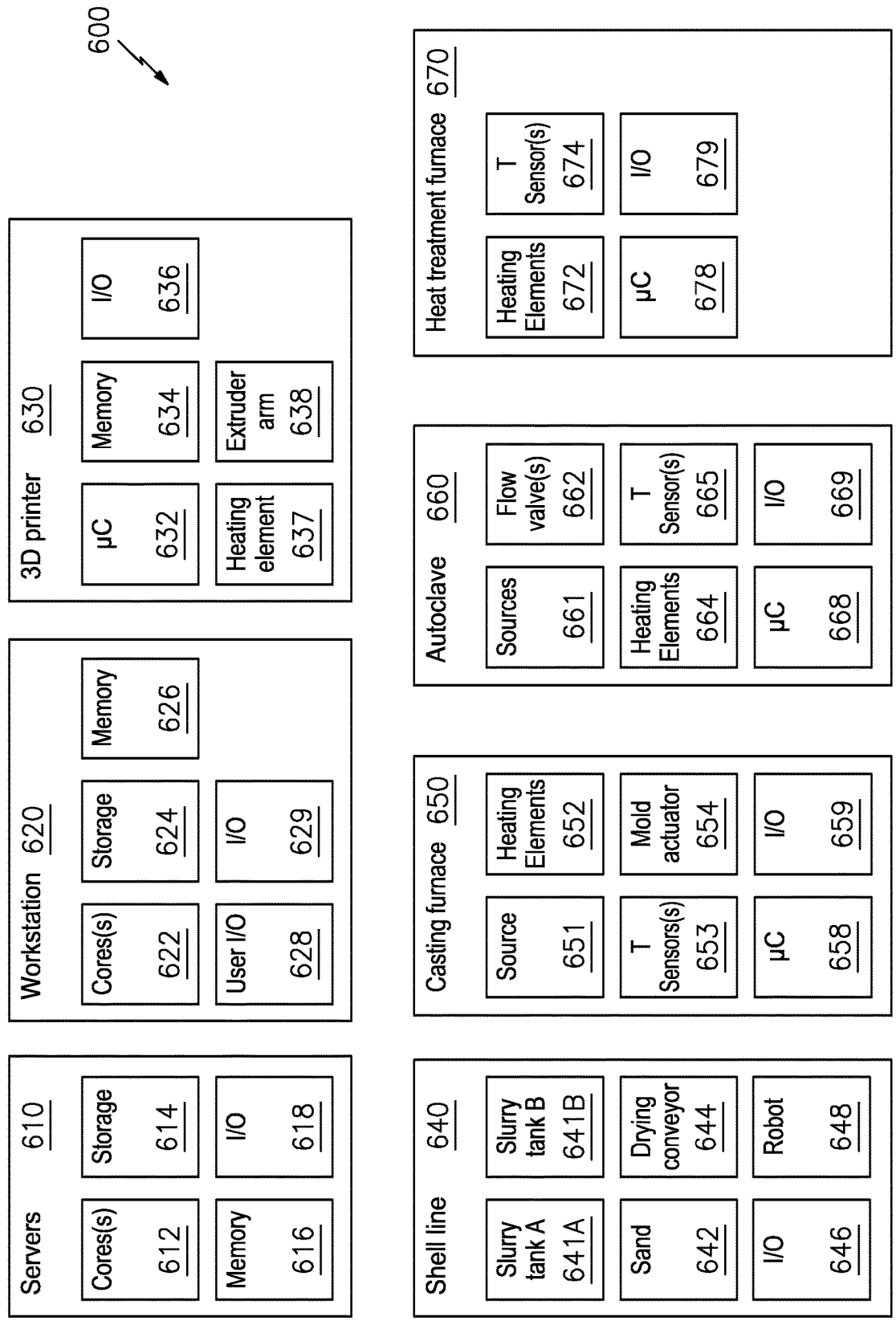
FIG. 2 is a block diagram of a system for carrying out the process of FIG. 1.

FIG. 1 is a high level flowchart of a process 20 for commercial scale casting. FIG. 2 is a block diagram of systems for implementing the process. Broadly speaking, the process 20 is an iterative process including a low fidelity (LF) stage 22 and a high fidelity (HF) stage 24. For time efficiency, the low fidelity stage includes an iterative configuration and modelling of a casting process. Then the high fidelity stage includes high fidelity modelling carried out in parallel with a casting trial 26. The high fidelity stage and casting trial are followed by an evaluation 28 of the trial results. If results are evaluated acceptable, the modeled configuration proceeds to casting production 30. If unacceptable, the process flow reenters at some point in the low fidelity stage 22 (e.g., discussed below).

As is discussed further below, the low fidelity stage 22 includes mapping out the casting process parameter space and may include numerous repeated low fidelity simulations to identify a target optimized configuration. The resulting configuration of the low fidelity stage 22 is then fed in parallel to the high fidelity stage 24 and the casting trial 26. This saves time relative to serial high fidelity simulations and casting trials.

An exemplary process is used in casting of aerospace components, namely gas turbine engine components. Particular gas turbine engine components of interest are single crystal (SX) castings of nickel-based superalloys such as are well known for blades, vanes, and combustor panels. The exemplary casting is investment casting. Depending on the particular product involved, the casting process may include casting internal cooling passages (e.g., using sacrificial ceramic and/or refractory metal casting cores (RMC)). Additional cooling outlet holes may be drilled or otherwise machined post-casting. Additionally, post casting processing may include finish machining and coating (e.g., with environmental barrier coatings (EBC), thermal barrier coatings (TBC), abrasive coatings, and/or abradable coatings).

FIG. 2 generally shows a system 600. The exemplary system 600 includes conventional hardware components having software specifically configured (reconfigured) to perform methods discussed below. A high performance computing system 610 (e.g., one or more servers) is generically shown as a single unit including: one or more processors (e.g., microprocessors or processing cores) 612; storage 614 (e.g., solid state, magnetic drive, optical drive, or the like) for storing programs and data; internal memory 616 (e.g., RAM); and hardware data input/output 618 (e.g., serial ports, ethernet ports, WiFi; and the like). In other implementations, the system 610 may represent plural networked computers or servers or the like.

Similarly, a single workstation 620 is shown for user input and output. This may be connected to the system 610 via local area network (LAN) (e.g., via ethernet, WiFi, or the like) or wide area network (WAN) or the like. The exemplary workstation includes: one or more processors 622; storage 624; memory 626; user input/output devices 628 (e.g., a flat panel or other display, a keyboard, pointing devices such as mice or track balls, and the like); and hardware data I/O 629.

Further manufacturing components include a polymer additive machine or 3D printer 630 for creating wax patterns. An exemplary 3D printer includes: a controller 632 (e.g., a microcontroller or other processor-based controller) for running various hardware elements; and memory 634 for storing instructions for controlling the various hardware elements and the current status of these elements during operation. Hardware data I/O 636 provides communication with the workstation 620 and additional system components depending upon the level of automation. An exemplary printing apparatus of the 3D printer includes an extruder having a heating element 637 for heating wax feedstock (e.g., from a source such as a wax wire reel) and an extruder arm 638 for manipulating the extruder output (e.g., having multiple actuators for 3D positioning of the extruder outlet during the extrusion and pattern buildup).

An exemplary shell line 640 functions to stucco/shell the pattern(s) and, optionally, dewax the resulting shell. The shell line 640 includes: one or more slurry tanks (dip tanks) 641A, 641B for sequential dipping of patterns (e.g. progressively fine-to-coarse ceramic slurries); a sand deposition apparatus (e.g., spray booth) 642 for applying sand to the dipped slurry to structurally reinforce the shell; and a drying apparatus (e.g., drying tunnel conveyor) 644 for drying the shelled pattern. FIG. 2 further shows, for an automated system, hardware data I/O 646 (e.g., as discussed above) and an industrial robot (e.g., six-axis arm) 648. The exemplary robot arm includes its own controllers, actuators, and I/O as may be conventional to, responsive to communication received via the I/O 646, manipulate fixtured pattern(s) through the process of sequential slurry dipping, and sand deposition and transfer to and potentially from the drying apparatus.

An exemplary casting furnace 650 provides automated melting and temperature maintenance of alloy to be cast, pouring of the alloy, temperature control of the shell(s) and controlled withdrawal of the shell. For example, an exemplary casting furnace 650 may include: a source 651 of molten alloy (e.g., including ingot melters, crucibles, and the like); heating elements 652 for heating the furnace chamber (e.g., an axial array of independently controllable induction heating elements allowing control of temperature gradient along an axis (typically a vertical axis) of mold movement through the furnace); temperature sensor(s) 653 for measuring temperature in the heating zone (e.g., a similar axial array of thermocouples); and a mold transportation apparatus 654 (e.g., a mold platform pedestal actuator) providing controlled withdrawal of the mold from the furnace to provide a directionally solidified (e.g., single-crystal) structure). Again, a controller 658 and hardware data I/O 659 are provided as with the 3D printer.

An autoclave 660 serves to deshell and decore (e.g., alkaline and/or acid leaching and/or thermo-oxidative removal) the cast shell. An exemplary autoclave includes: sources 661 of the liquid and/or vapor reactants under control of control flow valves 662. For maintaining temperature, exemplary heating elements 654 are resistive heating elements positioned surrounding the interior of the autoclave chamber. The temperature may be monitored by temperature sensors 665 (e.g., thermocouples arrayed around the chamber). A controller 668 and hardware data I/O 669 are also included.

An exemplary heat treatment furnace 670 is used to heat treat the casting. An exemplary furnace includes heating elements 672 (e.g., resistive heating elements surrounding the interior of the furnace chamber) and temperature sensors 674 (e.g., thermocouples) arrayed about the chamber. A controller 678 and hardware data I/O 679 are also included.

Figure 3:
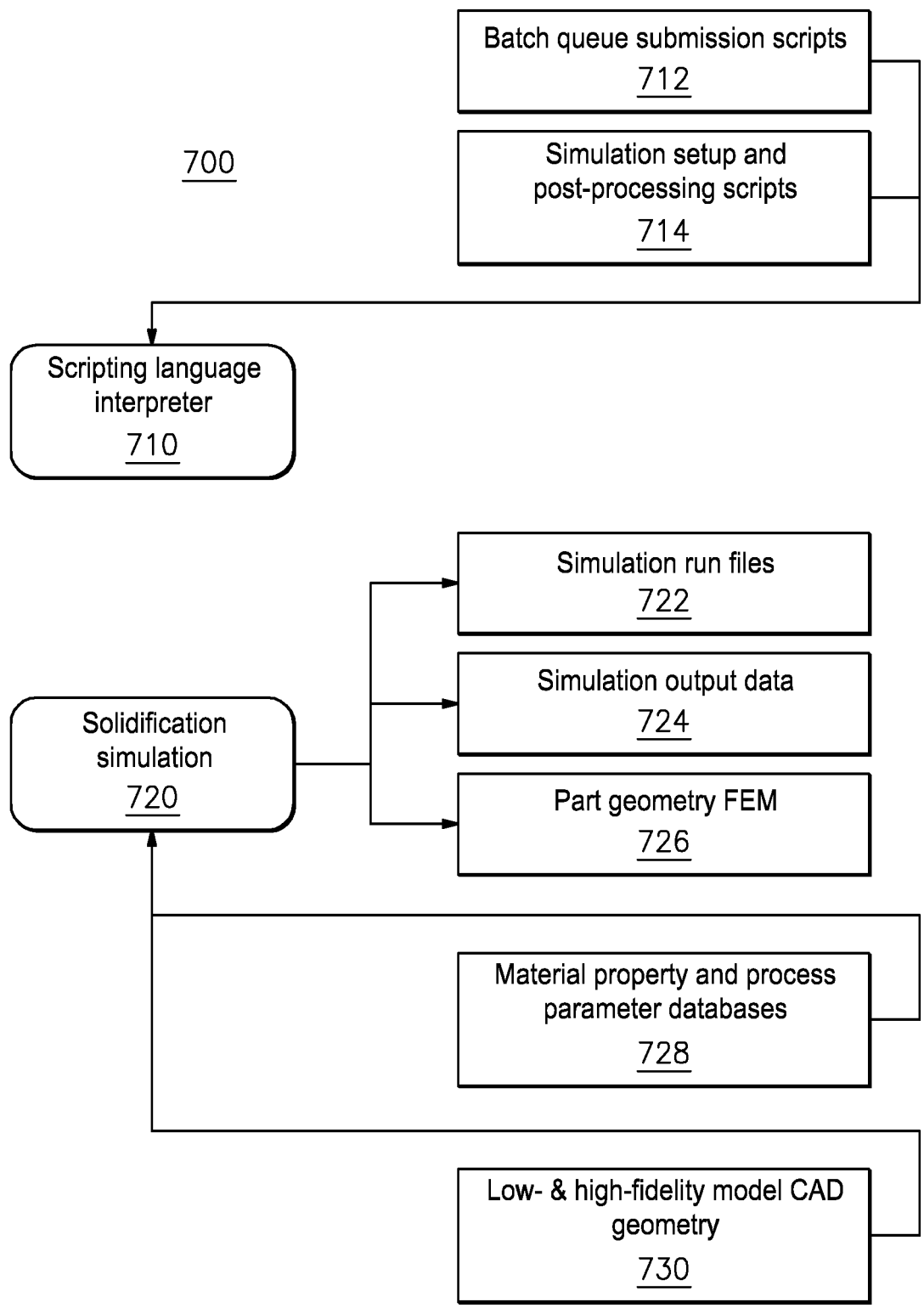
FIG. 3 is a block diagram of software and data on a high performance computing system in the system of FIG. 2.

FIG. 3 is a view of software 700 run on the high performance computing system 610. This is in addition to standard operational software including the operating system and the like and standard applications. A first software module is a high level scripting language interpreter 710. This accesses data in the storage 614. The scripting language interpreter 710 serves to perform automated tasks on the high performance computing system, including: causing other software modules to perform actions; transferring data structures between modules and systems using the high performance computing system's hardware data I/O 618; and performing numerical computations. A commercially available scripting language interpreter is Python™ (Python Software Foundation, 9450 SW Gemini Dr., ECM #90772, Beaverton, OR 97008, USA). The exemplary data structure 722 includes a library of scripts for simulation setup and simulation data post-processing. The data accessed includes: batch queue submission scripts 712; and simulation setup and post-processing scripts 714.

A second software module is a solidification simulation module 720. This accesses data in the storage 614. An exemplary solidification simulation software functions to numerically model the filling of a mold with molten metal and the subsequent cooling and solidification of this metal due to heat loss from convection, conduction, and radiation. One commercially available solidification simulation software is ProCAST™ casting process simulation software of the ESI Group, 100-102 Avenue de Suffren, 75015 Paris, France. The exemplary data structures include: simulation run files 722; simulation output data 724; part geometry finite element mesh (FEM) 726; a reference material property and casting process parameter database(s) 728, and a CAD geometry database 730 storing the low-fidelity CAD model and high-fidelity CAD model.

Figure 4:
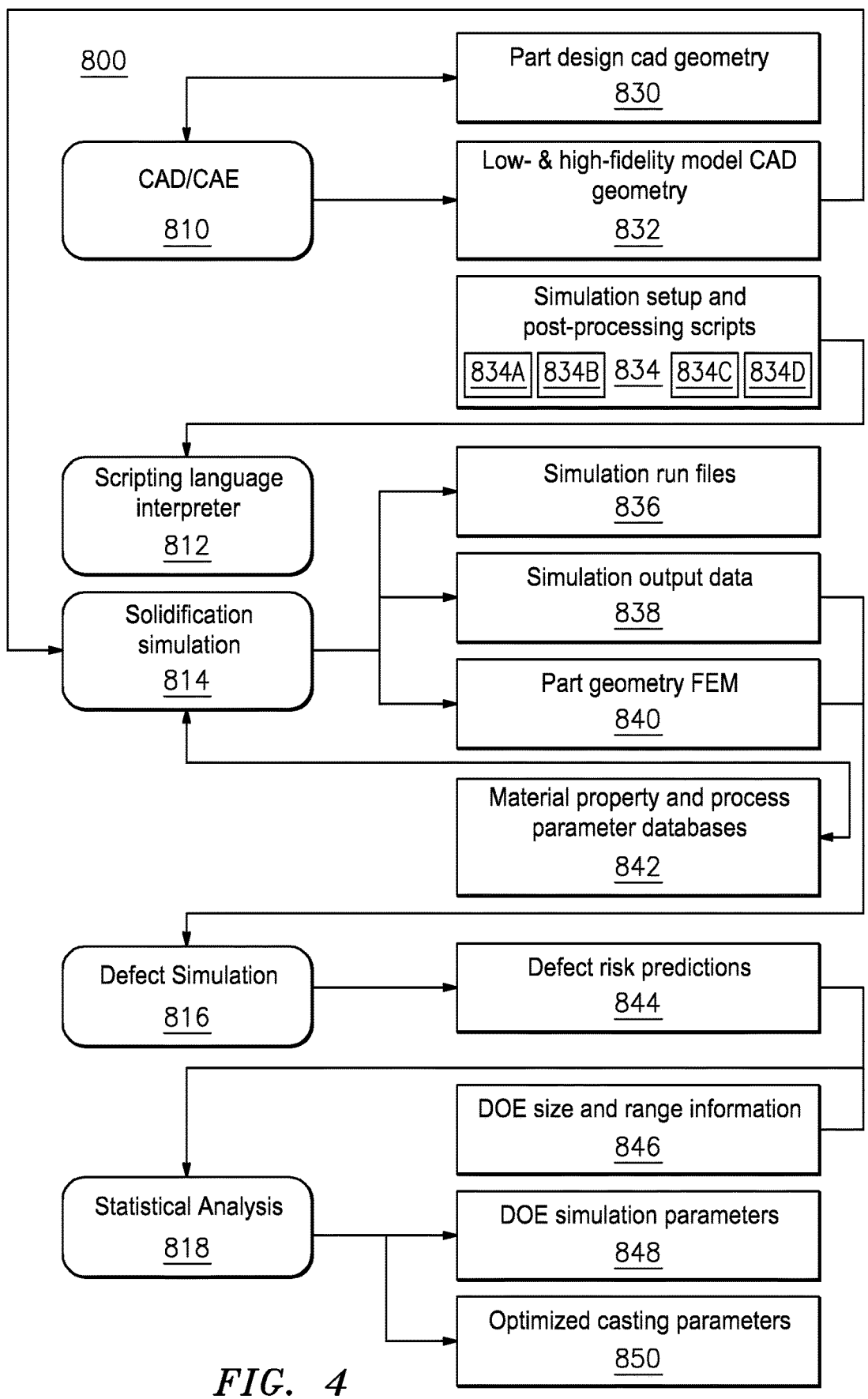
FIG. 4 is a block diagram of software and data on workstation in the system of FIG. 2.

FIG. 4 is a view of software 800 run on the workstation 620. The exemplary software includes: a CAD/CAE module 810 (e.g., Siemens NX™ software of Siemens PLM Software, 5800 Granite Parkway, Suite 600, Plano, TX 75024, USA); a high-level scripting language interpreter module 812 (e.g., similar to 710); a solidification simulation module 814; a defect simulation module 816; and a statistical analysis module 818.

Data structures stored in the storage 624 include: part design CAD geometry 830; low and high fidelity CAD geometries 832; simulation setup and post-processing scripts 834 (among several such scripts, particular scripts 834A-834D are discussed in further detail below); simulation run files 836; simulation output 838; a part geometry (e.g. both the low-fidelity and high fidelity) finite element mesh (FEM) 840; material property and process parameter databases 842; defect risk predictions 844; DOE size and range information 846; DOE simulation parameters 848; and optimized casting parameters 850.

Regarding the data structures, an example of the part design CAD geometry 830 is a solid modeling representation of the intended geometry of the finished part at the end of the manufacturing process including all features necessary for the part function, stored in a commonly accepted file format (e.g., Parasolid™ (Siemens Product Lifecycle Management Software Inc., Plano, Texas) or IGES). An example of the low- and high-fidelity CAD geometries would be a modification of the part design CAD geometry to additionally include solid modeling representations of some or all (respectively) features required for the investment casting process but not specifically necessary for the part function (such as gating or shell structures), also stored in a commonly accepted CAD file format.

An example of simulation setup and post-processing scripts would be scripts specifying commands in a high-level interpreted programming language which, when executed by a user or another script via the high-level language interpreter, may read other data structures, perform calculations, write files, or cause other programs to execute.

An example of simulation run files would be a collection of files in ASCII or binary format, which may or may not be human readable. When read from storage into memory by a program or script they specify the subsequent actions of that program or script. For example, a collection of ASCII and binary files may be read by the solidification modeling software and serve to specify the geometry, finite element mesh, thermal boundary conditions, and simulation parameters of the simulation performed by the solidification modeling software.

An example of the simulation output may be a collection of ASCII and binary files which contain a subset of the results of a calculation performed by the solidification modeling software (e.g., temperature histories).

An example of the part geometry finite element mesh may be a representation of one of the solid model CAD geometries as a collection of discrete elements joined at nodes into a network (mesh) suitable for numerical analysis, and stored in a file format readable by the solidification simulation software (e.g., UNV).

An example of the material property and process parameter databases would be a collection of ASCII files in a human readable format (e.g., XML or YAML) which specify one or more values for some or all of the parameters specified in the simulation run files. These may include heat transfer coefficients, furnace temperature schedules, phase transformation temperatures, viscosities, and other parameters.

An example of defect risk predictions may be ASCII or binary files containing the output of defect simulation software, such as spatial locations on part geometries (specified via the part finite element mesh) with collated numerical predictions of frequency, severity, or magnitude of one or more investment casting quality defect types (e.g., stray grain, or porosity), as well as simpler measures which summarize these predictions for a given simulation (e.g., total volume of porosity).

An example of DOE size and range information is a collection of human readable files containing a specification of the number of distinct simulations to be performed, as well as the values of all parameters specified in the simulation run files corresponding to each simulation.

An example of the optimized casting parameters would be a human readable file containing a set of values for all parameters specified in the simulation run files which correspond to a predicted or calculated minimum in the magnitude of one or all of the defect risk predictions.

Figure 1A:
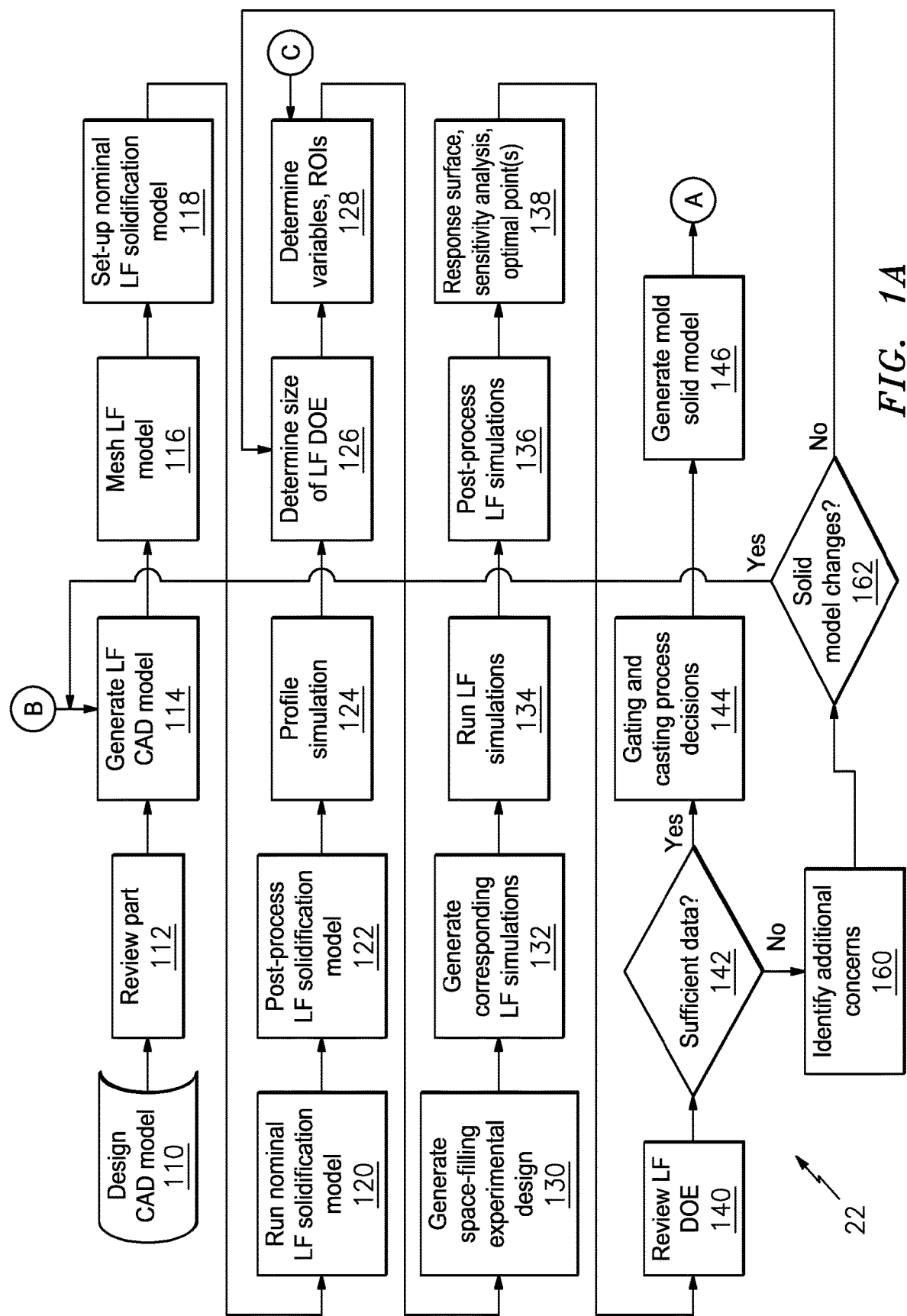
FIG. 1A is a flowchart of a low fidelity stage of the process of FIG. 1.

FIG. 1A shows further details of the low fidelity stage 22. Initially, the computer aided design/computer aided engineering (CAD/CAE) model (e.g., data 830 of FIG. 4) is designed 110. An exemplary implementation may involve a user (e.g., a design engineer) using the CAD/CAE software 810 to design a desired part geometry which meets the performance and use criteria of the intended application of the part, without special regard for manufacturing process. This may include an initial designation of a part material (alloy).

The resulting modeled part may then be reviewed 112 with respect to casting/castability. For example, a casting engineer may use the CAD/CAE software 810 (same workstation or another with appropriate database sharing) to review the specific part to be cast and identify potential areas of concern for typical defects, and determine a first approximation of nominal casting parameters (e.g., withdrawal rate, casting temperature, part orientation on the mold, shell thickness and properties) which would be used absent any additional input. The parameters may be identified by the casting engineer based on prior experience, and then input into the data structure 842 of the workstation by the casting engineer (e.g., using the solidification simulation software 814).

The user then generates a nominal low fidelity CAD model (e.g., stored in data 832 of FIG. 4) 114. This may modify the design CAD model of the part to include the minimum necessary features for the low-fidelity model. It may add simple geometric solids to stand-in for necessary gating features (starter block, feeder, and any grain continuators as required) and remove any detail or fine features which pose a difficulty for finite element mesh generation. For example, the user may use the CAD/CAE software 810 (FIG. 4) to read the part design CAD geometry (data structure 830) from storage into memory, then modify this CAD geometry so as to remove airfoil geometry features with small radii of curvature, or delete internal core geometry features, and finally to add simple geometric solids as approximations of gating. The user then outputs this new low-fidelity CAD geometry to the storage of the workstation (data structure 832).

The user then meshes 116 the generated low fidelity CAD model. For example, the user may import the low-fidelity part CAD model from the storage (data structure 832) of the workstation into either the solidification simulation/modeling software 814 (FIG. 4) or specialized meshing software and generate the finite element mesh representation (e.g., data 840 of FIG. 4) of the part. For the low-fidelity stage a coarse finite-element mesh may be acceptable in order to manage execution time.

From the meshed low fidelity model, a nominal low fidelity solidification model is then set-up 118. The user may load the mesh representation of the part (from data structure 840) into the solidification modeling software 814. The user may then specify in the software 814 the necessary boundary conditions, identification of material, and process parameters for the simulation according to the part review 112. Exemplary boundary conditions and process parameters include necessary furnace features (e.g., including temperature setpoints and chill temperatures), shell geometry (e.g., including thickness), and the presumed starting casting process parameters (e.g., pour rates and withdrawal velocities) as defined in the initial part review 112. That data may be stored by the software 814 as the simulation run files 836.

The nominal low fidelity solidification model is then run 120. The user transfers (e.g., using the workstation file system software) the simulation run files 836 to the high-performance computing (HPC) system 610 using the I/O 629 and 618 e.g., via the WAN or LAN. The user then submits the simulation run to the batch queue of the HPC according to requirements regarding number of nodes and queue selection. For example, upon completion, the solidification simulation software 720 writes the simulation output data 724 to storage.

The nominal low fidelity solidification output data is then post-processed 122. For example, the user transfers the result data 724 of the simulation run from the HPC system to the workstation using the workstation I/O via the WAN or LAN (e.g., a pull operation using the workstation file system software), and executes a post-processing script (a defect metric generation script) 834C with the high level scripting language interpreter 812. The post-processing script causes the workstation defect simulation software 816 to perform post-processing per requirements defined in the initial part review 112, generating the required defect risk predictions 844. The user reviews the results (e.g., using the solidification simulation software 814) to identify any errors which may have originated in the set-up.

A subsequent profile of the nominal low-fidelity simulation 124 is generated by the user via inspection of the output files of the solidification simulation, which determines per run system requirements. The profile may collate: total disk space and memory usage of the nominal simulation; total wall-clock run time of the nominal simulation; computational time required for post-process model steps; and total additional disk space required for post-processing steps. For example, the user may determine by inspection of the simulation run files 722, simulation output data 724, and defect risk predictions 844: (1) the time that the nominal simulation and post-processing required; and (2) the amount of space on storage 614 and 624 that the nominal simulation and post-processing required.

The size of the low fidelity design of experiment (DOE) is then determined 126. For example, the user may consult with casting engineers to determine schedule needs and priority for the analysis. Using this information in conjunction with the results of simulation profiling 124, the user determines the maximum number of runs which can be conducted within the required time frame. For example, based on an externally-imposed time goal (e.g., two working days) the user may determine the available computation time (e.g., one working day). Taking the results of the simulation profile 124, the user may then determine: the maximum size of the DOE for that available computation time (e.g., twelve simulation runs within that one working day); and the required require amount of space on the storage 614.

A number and range of variables and regions of interest (ROI) are then determined 128. For example, in collaboration with casting engineers, the user determines the casting process parameters which must be investigated for the part. Considering the maximum possible size of the simulation campaign determined 126 and the initial review of the part 112, the user selects the process variables for the DOE. The user also selects the range of variation to consider for each variable, and identifies any regions of interest where there is particular concern for defects. For example, if a twelve-simulation run DOE size is determined for a blade then the user may: select only the single most critical process parameter identified in the initial review 112 (e.g., mold withdrawal velocity); designate a range for this variable (e.g., between two and twenty inches per hour); and select the region of particular interest (e.g., the trailing edge of the airfoil).

A space-filling experimental design is then generated 130. For example, the user inputs the selected number of runs, number and range of process variables into an experimental design generation script 834A (FIG. 4) in storage 624 using user I/O 628. The user then executes this script using the high level scripting language interpreter 812. This script causes the statistical analysis software 818 to read the number and range of variables from storage 624, compute an experimental design (a specific selection of process variables and corresponding simulation parameters for each run in the simulation campaign), and then write this design to storage 624 as the DOE simulation parameters 848. The experimental design generation script then reads this design from storage 624 into memory 626 where it performs the computations necessary to generate the necessary inputs for creation of low fidelity simulation input files for the solidification modeling software. The script then writes these input files to the data structures 840 and 842 on storage 624.

For example, in the generation 130, the user may input a range for the single process variable (e.g., a withdrawal velocity of two to twenty inches per hour), and a total number of simulations (e.g., twelve) to the experimental design generation script 834A. The script then causes the statistical analysis software to select said twelve values for withdrawal rate according to the desired experimental design algorithm, and write these to storage. The experimental design generation script then reads these values and generates the necessary modifications to the process parameter database 842 for the solidification simulation software.

The corresponding low fidelity simulations are then generated 132. For example, the user executes an automated simulation setup script 834B on the workstation. This script causes the solidification modelling software to read the experimental points and the nominal LF solidification simulation run files from data structures 836 and 842. The script then causes the solidification modeling software to generate a corresponding solidification simulation run file 836 for each experimental design point.

The low fidelity simulations are then run 134. For example, the user transfers (e.g., using the workstation file system) the generated simulations to the HPC, and then executes an automation script (batch queue submission script) 712 on the HPC which causes each solidification simulation to be submitted to a batch process queue according to requirements regarding number of nodes and queue selection. For example, upon completion, the solidification simulation software 720 writes the simulation output data 724 for each run to storage. The batch queue submission script 712 then collates the simulation output data 724 from each simulation.

The low fidelity simulations are then post processed 136. For example, the user may use the HPC file system software to transfer the simulation output data 724 to the workstation storage 624. Then the user may execute the defect metric generation script 834C on the workstation which causes the defect simulation software 816 to perform identical post-processing for each of the simulations generate the standard defect risk predictions 844 for each simulation.

The response surface, sensitivity analysis, and optimal point(s) are then generated 138. For example, the user may execute another automation script (a sensitivity and optimization script) 834D on the workstation which collates the defect risk predictions 844 and solidification modeling simulation output data 838 for each simulation point. This sensitivity and optimization script then causes the statistical analysis software 818 read this collated data and: numerically compute a an n-dimensional response surface for the n defect risk predictions 844; perform a sensitivity analysis for each of the process variables for each defect metric; and use the response surface to optimize the casting process parameters within the variable ranges identified in the initial review 112. The sensitivity and optimization script may then cause the statistical analysis software 818 to output the optimized casting process parameters to data structure 850. The sensitivity and optimization script may then perform additional numerical computations on the optimized casting process parameters according so as to render them compatible with the input and operation requirements for other hardware (e.g., 600).

The low fidelity design of experiment is then reviewed 140. For example, the user may collate the optimized casting process parameters 850, the defect risk predictions 844, and simulation output data 838 for each simulation in the DOE using the solidification software 814. The user may then review these collated results with casting engineers and compare them against the concerns identified in the initial review 112.

It is then determined 142 whether there is sufficient data to proceed to gating and casting process design. For example, the user and casting engineers may collate the results of review 140 and the risk items identified in the initial part review 112. The user and casting engineers may then jointly determine if the DOE results have provided sufficient information to proceed to a trial casting experiment based on their prior experience and judgement.

If the user and casting engineers determine that the generated data is sufficient to support a decision, then the gating and casting processes are then selected by the casting engineers 144.

The mold solid model is then generated 146. For example, the casting engineer may use the CAD/CAE software 810 to read the design part model 830. The casting engineer may then read the optimized casting parameters 850 with the CAD/CAE software 810 to modify the design part model 830 accordingly. This may include: correctly positioning the part relative to the mold and furnace dimensions; adding gating features where determined by the optimized casting process parameters 850; and correctly spacing the part on the mold. The casting engineer may then output the mold solid model to the data structure 832.

Then, at location A, the process continues to the high fidelity stage 24 and casting trial 26 of FIG. 1.

If, however, sufficient data was not found in the determination 142, additional concerns are identified 160. For example, the user and casting engineers jointly identify what defects or other risk items have not been sufficiently addressed, and what the corresponding controlling process parameters might be. This generally involves critical comparison of the identified risk concerns from the initial review 112 with the collated results of the review 140. For example, the user may compare the defect risk predictions 844 for a specific defect (e.g., grain defects) and determine that the initial review chose an insufficient parameter value range. For example, the parameter may be the aforementioned withdrawal velocity. The specified range may have been an exemplary two to twenty inches per hour. The risk predictions may indicate a low in defects at one extreme of this range (e.g., the low end), suggesting that the range should be expanded in that direction (e.g. to a new range of 0.5 to three inches per hour).

The user then determines 162 whether solid model changes are needed. This generally serves to determine if the additional concerns 160 will require changes to the low fidelity CAD model 832. For example, the user may review the additional concerns 160 and determine if any additional gating structures or part model features must be included to address them.

If solid model changes are needed, the user employs the CAD/CAE software 810 to modify the low fidelity CAD model 832 such that a new low fidelity CAD model is generated 114 and the process continues therefrom. If no needed solid model change is determined, the size of the next low fidelity design of experiment is re-determined 126 (reflecting the additional concerns 160) and the process continues.

Figure 1B:
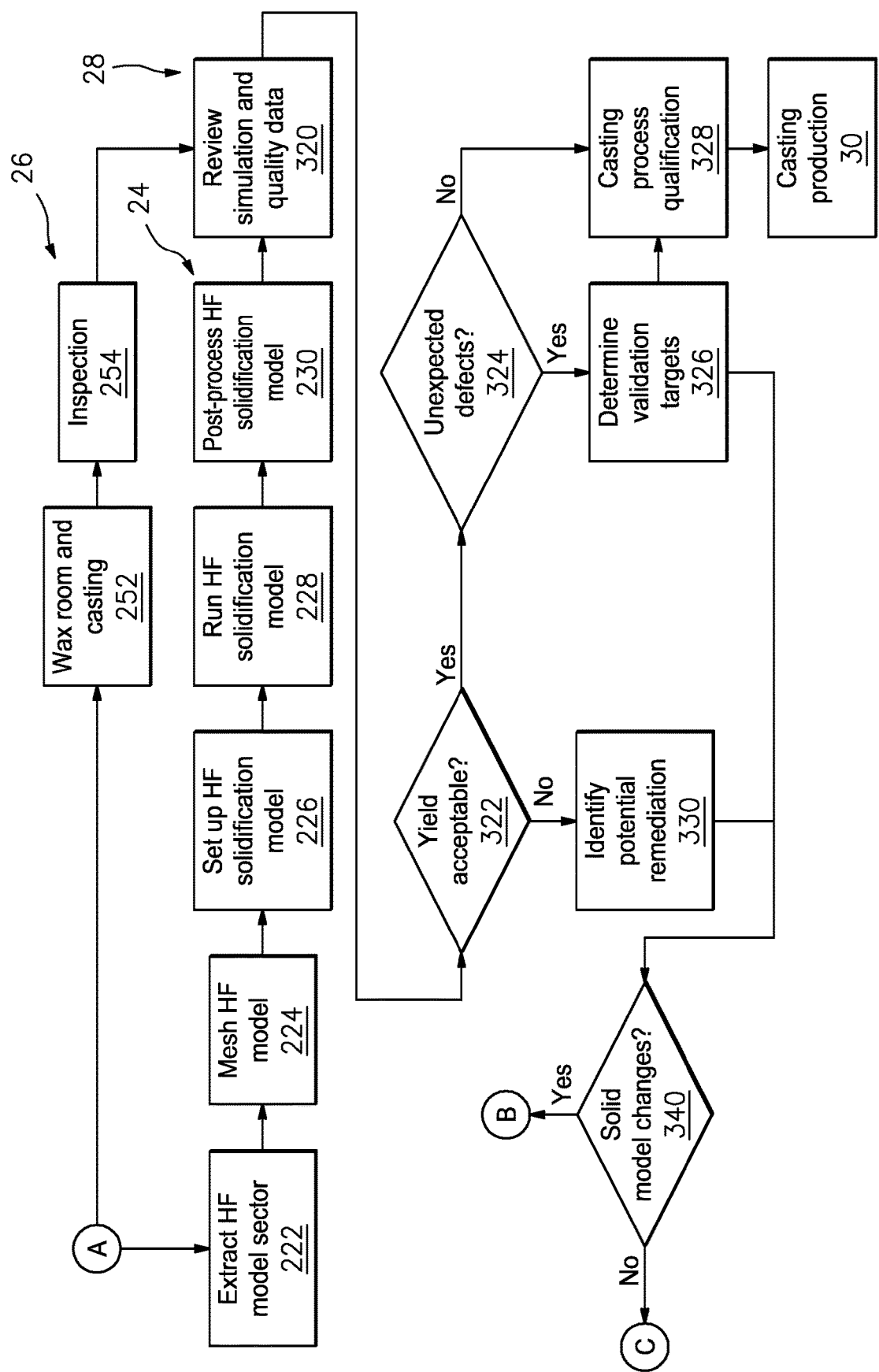
FIG. 1B is a flowchart of further stages of the process of FIG. 1.

FIG. 1B shows the remaining stages of FIG. 1. The high fidelity stage 24 and casting trial 26 are shown in parallel feeding the results analysis 28.

The exemplary high fidelity stage 24 includes extraction 222 of the high fidelity model sector. For example, the user may load the high-fidelity mold CAD model 832 which was generated 146, using the CAD/CAE software 810. The user may then modify the high-fidelity CAD model 832 for compatibility with the solidification modeling simulation software 814. This may include actions such as: extracting a representative sector according to the rotational symmetry of the mold; removing features which are not relevant to the solidification modeling software 813 (e.g., mold plate supports); and improving any solid features which may negatively impact generation of the finite element mesh (e.g., gating pad contacts). The user may then output the modified CAD model from the CAD/CAE software 810 to data structure 832.

The high fidelity model is then meshed 224. For example, the user may import the high-fidelity mold CAD model from the storage (data structure 832) of the workstation into either the solidification simulation software 814 or specialized meshing software (not shown) and generate the finite element mesh representation of the part. The mesh should be fine enough to capture all part details, with secondary concern paid to execution time or mesh density.

From the meshed high fidelity model, a high fidelity solidification model is then set up 226. For example, the user may load the high fidelity mesh representation of the part (from data structure 840) into the solidification modeling software 814. The user may then specify in the software 814 the necessary boundary conditions and process parameters for the simulation according to the optimized casting parameters (data structure 850). The data may be stored by the software 814 as the simulation run files 836.

The high fidelity solidification model is then run 228. For example, the user transfers (e.g., using the workstation file system software) the high fidelity simulation run files (from data 836) to the storage of the HPC system 610 (data 722) using the I/O 629 and 618 (e.g., via the WAN or LAN). The user then submits the simulation run to the batch queue of the HPC according to requirements regarding number of nodes and queue selection. Upon completion, the solidification simulation software 720 writes the simulation output data 724 to storage.

The high fidelity solidification model is then post processed 230. For example, the user transfers the result data 724 of the simulation run from the HPC system to the workstation using the workstation I/O via the WAN or LAN (e.g., a pull operation using the workstation file system software), and executes the defect metric generation script 834C with the high level scripting language interpreter 812. The defect metric generation script causes the workstation defect simulation software 816 to perform post-processing per requirements defined in the initial part review 112, generating the required defect risk predictions 844. The user reviews the results (e.g., using the solidification simulation software 814) to identify any errors which may have originated in the set-up.

In the testing trial 26, the casting is first performed 252. This may include generating a wax pattern for the casting corresponding to the mold solid model 832, shelling the pattern, investment casting of the metal, final machining, and any other finishing steps as per standard foundry practice. For example, the casting engineer may transfer details of the high fidelity CAD model 832 from the workstation storage 624 to the 3D printer memory 634, causing the 3D printer to generate a wax pattern according to the optimized casting process parameters 850 generated by the statistical analysis software 818 and the sensitivity and optimization script 834D. The wax pattern may then be manually transferred to the wax room (not shown) for final mold pattern assembly, and then manually transferred to the shell line 640.

The casting engineer may transfer details of the optimized casting process parameters 850 from the workstation storage 624 to the shell line robot 648 via shell line I/O 646, using the WAN or LAN. The shell line robot 648 may: dip the wax mold pattern repetitively into slurry tanks 641A and 641B; expose the dipped pattern to sand 642; and deposit the dipped pattern on/in the drying tunnel conveyor 644. The sequence, number, and timing of these operations may be determined according to the optimized process parameters 850 (e.g., shell thickness). The shelled pattern may then be manually transferred to the casting furnace 650. The casting engineer may transfer the details of optimized casting process parameters to the casting furnace storage 651 using the casting furnace I/O 659 via, e.g., the WAN or LAN.

The casting engineer may then cause the casting furnace 650 to perform investment casting of the shelled mold. The casting furnace microcontroller 658 may read the optimized process parameters 850 from the storage 651 and control the investment casting process according to these parameters (e.g., casting temperature via the temperature sensors 653 and heating elements 652, or mold withdrawal velocity via the mold actuator 654).

After investment casting, the cast article(s) may be manually transferred to post-cast machining (not shown—e.g., for degating/rough machining), and then manually transferred to the de-shelling autoclave 660. The casting engineer may transfer the optimized process parameters 850 from the workstation storage 651 to the autoclave microcontroller 668, using the autoclave I/O 669 via the WAN or LAN. The autoclave microcontroller 668 may then cause the flow valves 662 and heating elements 664 to repeatedly expose the parts to elevated pressures and temperatures and caustic solution in order to dissolve the solid core from the internal passages of the part. The microcontroller 668 may control pressures and temperatures according to the optimized process parameters 850.

The cast article(s) may then be manually transferred to the heat treatment furnace 670. The casting engineer may transfer the details of optimized casting process parameters to the heat treatment furnace microcontroller 678 using the heat treatment furnace I/O 679 via, e.g., the WAN or LAN. The casting engineer may then cause the heat treatment furnace to expose the parts to elevated temperatures. The heat treatment microcontroller may control the heating elements 672 via the temperature sensors 674, in accordance with the optimized process parameters 850 (e.g., heating rates, heating times). The cast article(s) may then be manually transferred to any final finishing or machining operations.

The resulting cast article(s) are then inspected 254. For example, the casting engineer may perform quality inspections such as: etching the part with an acidic etchant and inspecting it visually for surface grain defects; and performing a fluorescent penetrant inspection for optical indication of porosity defects. The casting engineer may then note the frequency and spatial distribute of any such defects on the cast article(s).

In the determination 28, there is an initial review 320 of simulation and quality data. For example, the user may collate high-fidelity simulation output data from the high fidelity stage 24 and casting quality inspection results from the casting trial 26. In collaboration with casting engineers, the user may review both sets of data and determine if the defect risk predictions 844 from the high fidelity simulations match the defects observed in the casting quality inspection 254. The user may then rationalize any deviations from expectation in both simulation and casting trial results to the best possible ability. For example, the user may compare a given defect distribution (e.g., grain defects) predicted in the high fidelity simulation defect risk predictions 844 to the defects observed in the corresponding quality inspection 254 (e.g., visual grain defect inspection). The user may then compare the predicted and observed incidence rate of a given defect in the particular region of interest (e.g. the airfoil trailing edge).

It is then determined 322 whether the yield is acceptable. This determination may include a review of the total observed incidence of grain defects, measurement and calculation of deviation from specified dimensional tolerances, and a review of the total observed incidence of porosity size limit violations (e.g., individual pores exceeding threshold). Casting engineers determine if the total yield of the casting trial meets acceptable limits, per foundry needs and best practice.

If yield is determined acceptable, it is further determined 324 whether there are unexpected defects. The user collates the results of the review 320 for each of the defect risk predictions (data structure 844) and determines if any difference between predicted and observed incidence rate for a given defect was observed (e.g., if higher incidence of grain defects was observed in the airfoil trailing edge). Based on the prevalence of any such defects and the overall yield of the casting trial, the user and the casting engineers jointly determine if additional process simulations are warranted to further improve casting yield.

If it is determined that additional process simulations are warranted, then the user determines 326 validation targets for the further process simulations. For example, the user determines what casting process parameter(s) would control the prevalence of the defects observed in the review 320, based on the defect risk predictions 844 and the process parameter sensitivity generated 138 by the statistical analysis software 818. The user then uses this determination to select the process parameters and ranges for a new low fidelity simulation DOE. For example, the user may review the quality inspection data reviewed 320 for a given defect type (e.g., grain defects). The user may then compare this data with the parameter sensitivity analysis for this given defect type, and select the most sensitive process parameter (e.g. withdrawal rate). Collating this information with the process parameter range selected in the initial review 112, the user would then select a new process parameter range which would expand on the previously constructed 130 design of experiment.

If the user and casting engineers observe no defects which they consider unexpected (e.g. which were not predicted by the high or low fidelity simulations), the process is deemed 328 qualified. The tested parameters may then be put into commercial scale production 30 of the castings. Whereas the trial may be of a single cluster or tree, commercial scale will involve clusters/trees sequentially produced singly or in groups in one or more furnaces over extended period such as months or years.

If the user and the casting engineers determined that the yield was unacceptable, then they identify potential remediating actions 330. For example, the user may collate the quality inspection data reviewed 320 and the parameter sensitivity analysis generated 138 by the statistical analysis software 818. For each given defect type observed in the casting quality inspection 254, the user may select the process parameters which showed the highest sensitivity to this given defect in the defect risk prediction 844. Based on these selections, the user may then determine 340 whether solid model changes are required. The process continues at the appropriate cell in the low fidelity stage 22 depending on the answer. If changes are required, then the process returns (forks back to FIG. 1A location B) to the low fidelity stage generation 114 of the nominal low fidelity CAD model. If solid model changes are not required, then the process returns (forks back to location C) to the low fidelity stage determination 128 of the number and range of variables, and regions of interest.

Figure 1C:
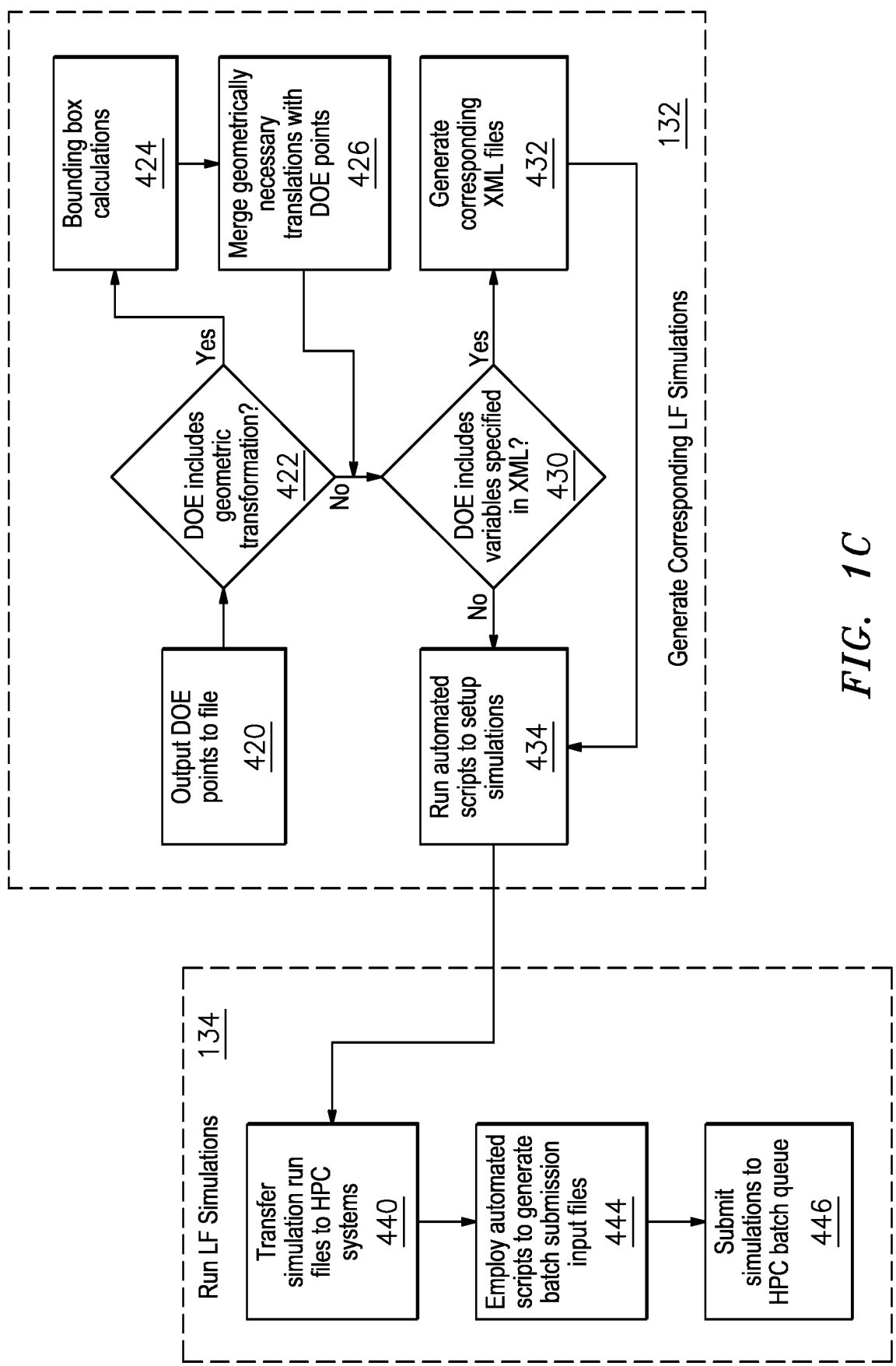
FIG. 1C is a flowchart of low fidelity simulation generation and low fidelity simulation run in the low fidelity stage of FIG. 1A.

FIG. 1C shows further details of the exemplary generation 132 of low fidelity simulations and running 134 of low fidelity simulations. The design of experiment points are outputted 420 to file. For example, the user may execute an automation script (the experimental design generation script) 834A (from workstation data structure 834) using the high level scripting language interpreter 812 which causes the statistical analysis software 818 to read the DOE size and range information 846 from the workstation storage 624. The experimental design generation script causes the statistical analysis software 818 to compute and subsequently output 420 the individual parameter values 848 for each simulation point in the design of experiments to the workstation storage 624. The experimental design generation script then determines 422 whether or not the design of experiment includes a geometric transformation by reading the DOE size and range information 846 from workstation storage and inspecting it for a parameter which requires such a transformation. If yes, then the experimental design generation script performs bounding box calculations 424 and computes the geometrically necessary translations. The experimental design generation script then merges 426 these calculated translations the with design of experiment points. Then, or if no geometric transformation was included, the experimental design generation automation script determines 430 whether the design of experiment includes one or more variables specified in a markup language format (e.g., Extensible Markup Language (XML)). If yes (to determination 430), then the experimental design generation script generates corresponding markup language files by: reading the DOE simulation parameters 848 from workstation storage 624; constructing markup language formatted files in workstation memory 626; and writing the resulting markup language files to storage 432.

Then, or if no (to determination 430), the low fidelity simulations are run 134. For example, the simulation setup script 834B may cause the solidification simulation software 814 to generate 434 simulation run files for each design of experiment point and output these files to storage. Then, the user may transfer the simulation run files 836 from storage 440 to HPC storage 614 using the workstation file system software via the WAN or LAN. The user then executes automation scripts using the high level scripting language interpreter 812 on the HPC system, and the automation script 712 generates 444 batch submission input files. That automation script may then submit 446 the simulation run files 722 to the batch queue of the HPC according to requirements regarding number of nodes and queue selection.

Figure 1D:
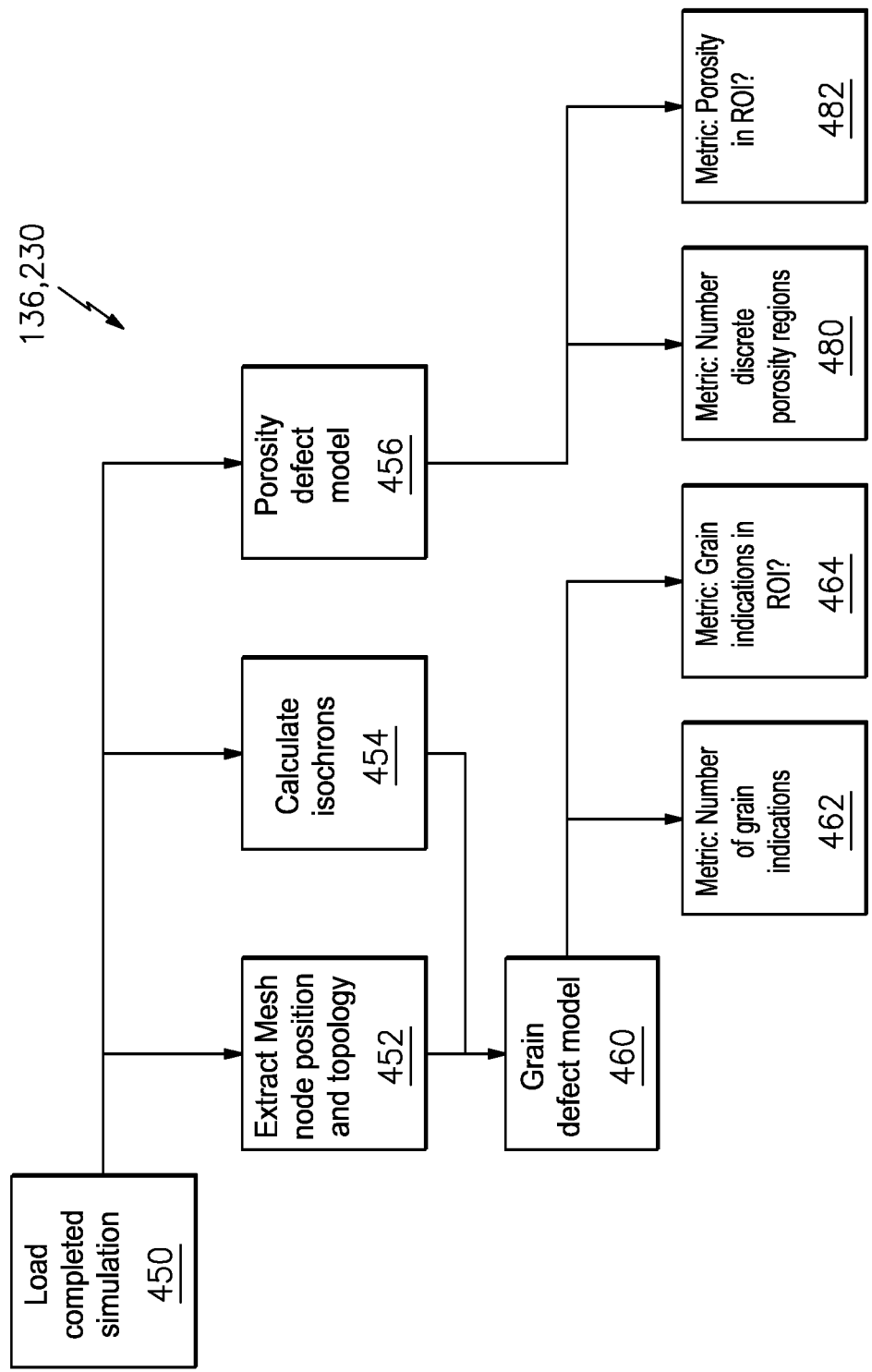
FIG. 1D is a flowchart of post processing in the low fidelity stage of FIG. 1A or a high fidelity stage of FIG. 1B.

FIG. 1D shows further details of the exemplary post processing 136, 230. For example, the user may execute the defect metric generation script 834C using the scripting language interpreter 812. Then, that defect metric generation script may cause the solidification simulation software 812 to load 450 the completed simulation output data 838 from the workstation storage 624 into the workstation memory 626. In parallel, that defect metric generation script may then cause the solidification simulation software 814 to: extract 452 the finite element mesh node positions and topology from the part geometry FEM 840; calculate 454 the temperature and solidification history of each node (e.g. isochrons, simulation time at which each node reached a given temperature); and perform 456 porosity defect model calculations (e.g., Niyama criterion (Ny*) and/or hotspots). The exemplary extraction 452 serves to generate output data structures which will provide input to defect metric criteria and involves reading details of the spatial positions of the nodes which comprise the part finite element mesh representation from memory, formatting these, and outputting them to storage 624.

Exemplary temperature and solidification history calculation 454 and porosity defect model calculations 456 serves to generate output data structures relevant to the solidification and defect risk performance of the cast article(s). These may involve the defect simulation software 816 or the solidification simulation software 814 reading simulated nodal temperature and solidification history from memory 626, performing numerical calculations on these values, and outputting the results of said calculations to storage 624.

The defect metric generation script 834C may then cause the defect simulation software 816 to run the grain defect model 460. For example, the defect metric generation script may cause the defect simulation software 816 to read the extracted node positions, node topology, and calculated temperature and solidification history from the storage 614. Then the defect simulation software may perform numerical computations on this data which serve to calculate the risk of a grain defect occurring in the part. The defect simulation software 816 may then output a first metric 462 of the number of grain indications and a second metric 464 of the grain indications in the regions of interest.

In parallel, the defect metric generation script 834C may cause the defect simulation software 816 to run a porosity defect model 456. For example, the defect metric generation script 834C may cause the defect simulation software 816 to read the temperature and solidification history from the storage 614. Then the defect simulation software 816 may perform numerical computations on this data to calculate the risk of a porosity defect occurring the part. The defect simulation software 816 may then output a metric 480 of the number of discrete porosity regions and a metric 482 of porosity in the regions of interest.

In one group of examples of the relative properties of the LF simulation and the HF simulation, the LF simulation uses a coarser mesh (even to the point of omitting features) whereas the HF simulation uses a sufficiently fine/high quality mesh to capture all features; the LF simulation approximates gating features by simple geometric structures such as right circular cylinders, prisms, and the like whereas the HF simulation has a fuller to exact modelling of gating, the LF simulation omits one or more casting cores whereas the HF simulation includes them; the LF simulation Furnace model may be simplified to a simple geometric approximation of the furnace chamber whereas the HF simulation uses a fuller furnace model; the LF simulation number of parts per mold may not be identical to casting intent (e.g. modelling a single cavity or dual cavity whereas the HF simulation may model a cluster with more cavities, the LF simulation part geometry may not accurately represent the intended final part geometry, whereas the HF simulation may have a complete an accurate representation of the final part geometry as it will be cast; the LF simulation may involve manually simplified or removed features (e.g., trip strips) which are challenging to mesh whereas the HF simulation may have unsimplified or less simplified features and/or fewer, if any omitted features; the LF simulation target run time may be smaller (e.g., 1 hour to 2 hours) whereas the HF simulation may be several times larger (e.g., at least 8 hours or an exemplary 8 to 48 hours or 8 to 12 hours).

Figure 5:
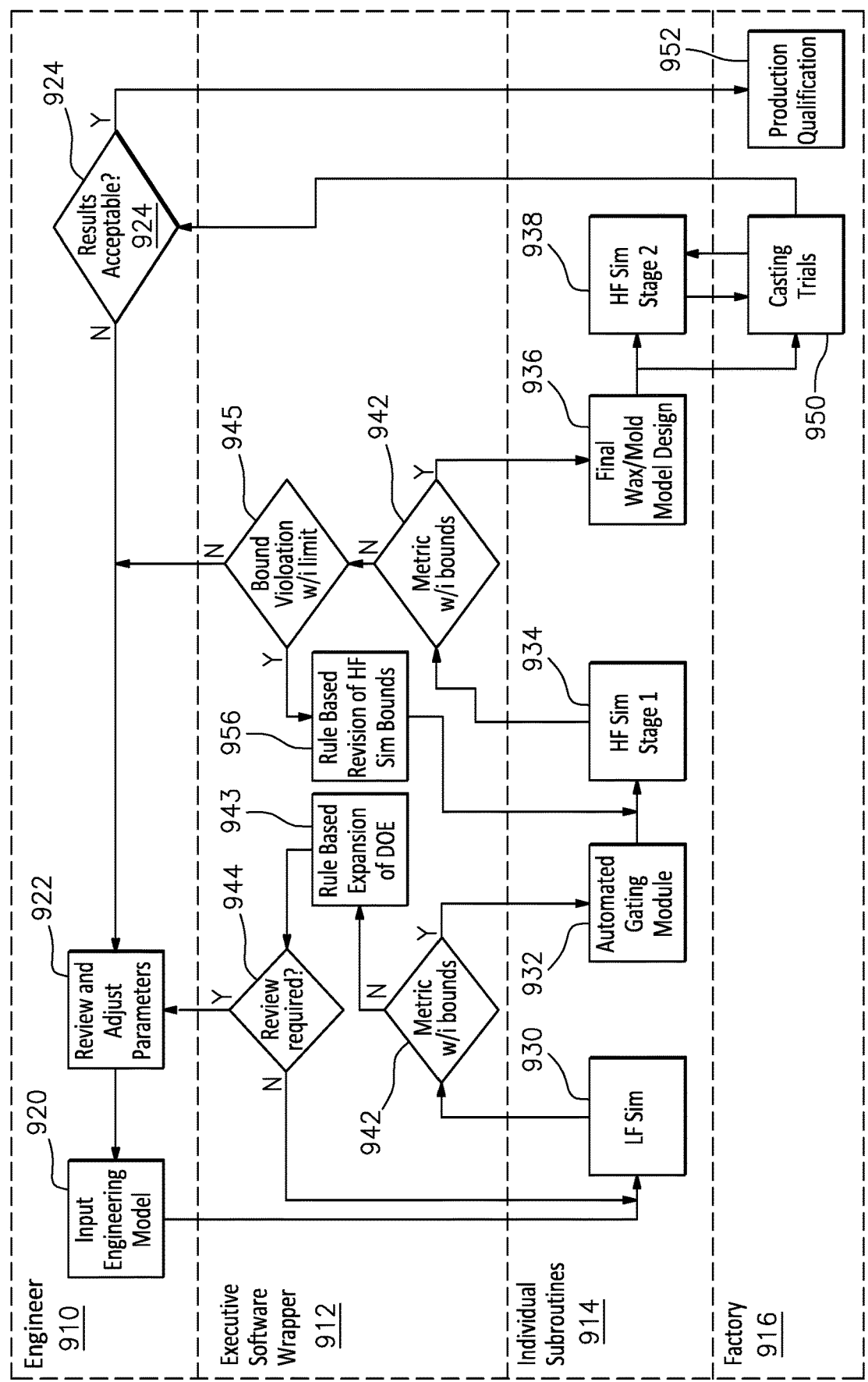
FIG. 5 is an alternative map of operation of a variation on the system of FIG. 2.

FIG. 5 is a map 900 providing an alternative depiction of a variation on the system of FIG. 2. The map shows separate zones for: engineering personnel 910; an executive software wrapper 912 (e.g., an additional automation script running on the user workstation 620 which controls some portion of the automation scripts and software packages described in FIGS. 3 and 4 and performs analysis on their outputs); individual subroutines (or groups thereof) 914; and the factory 916.

The engineering activities include 920 as step for inputting the engineering model (both initially and in feedback). This may include the engineer using the CAD/CAE software 810 to design a desired part geometry (as in 110 of FIG. 1A), reviewing the part solid model and designing nominal casting parameters (as in 112 of FIG. 1A), and then using the CAD/CAE software 810 to generate a nominal CAD model of the part including minimum necessary casting features (as in 114 of FIG. 1A).

In feedback, the engineering activities include a step 922 for review and adjustment of parameters feeding back to the step 920. The step 922 may include the executive software wrapper 912 collating defect risk predictions 844 and the results of the rules-based expansion of the design of experiments 943. The executive software wrapper 912 then writes the collated data to the workstation 620 in a human-readable format (e.g., reStructuredText or eXtensible Markup Language) which highlights differences between the rules-based expansion of the design of experiments 943 and the original input values 920. The step 922 further includes the engineer reading and reviewing the human-readable format collated data using the workstation user I/O 620. The engineer may then use the CAD/CAE software 810 to modify the engineering model in order to accommodate the rules-based expansion of the design of experiments 943, then use the workstation user I/O 628 to adjust the operating bounds of the executive software wrapper 912 on the workstation storage 624, and then feed these back into step 920. For example, the engineer may cause (e.g., by using the workstation user I/O 628 to execute the high level scripting language interpreter 812) the executive software wrapper to read the modified engineering model, operating bounds, and rules-based-expansion of the design of experiments from the workstation storage 624 into the workstation memory 626. The executive software wrapper may then cause the solidification modeling software 814 to generate a meshed representation of the modified engineering model, generate the required simulation run files 836 for the expanded design of experiments, and write the simulation run files to the workstation storage 624. The executive software wrapper may then transfer the simulation run files 836 to the HPC system 610 using the I/O 629 and 618 and submit the simulation run files to the HPC batch queue as in step 120. The exemplary implementation provides three feedback paths from the executive software wrapper 912. Two paths are directly to the step 922, and the review at step 922 from these paths would include only collated defect risk predictions 844 and rules-based expansions (from below step 943 or step 956) of the design of experiments written by the executive software wrapper to the workstation 600. The third path passes through a casting trials results evaluation step 924, and the review at step 922 from this path would additionally include physical casting trial results. For example, in step 922 the executive software wrapper might combine the predicted defects from the defect risk predictions 844 with the results of the physical casting trial into an overlay graphic and write this to the workstation storage 624 for review by the engineer.

The engineering model is fed to the low fidelity simulation subroutine 930. Step 930 encompasses the actions described in steps 114 through 140 of FIG. 1A, where all submission, transfer of data between file systems, and execution of software packages is performed by the executive software wrapper. Determinations necessary in steps 126 (LF DOE size) and 128 (DOE variables of and ROIs) are made by algorithms contained in the executive software wrapper rather than the engineer. The results of step 930 are used in a metric evaluation step 940. For example, the executive software wrapper may collate the defect risk predictions 844, simulation output data 838, optimized casting parameters 850, and compare them via a pre-determined algorithm to determine if the simulation results are acceptable for a casting trail (as in step 142). If within bounds, the resulting optimized casting parameters 850 transferred by the executive software wrapper to an automated gating module routine 932.

This module routine 932 generates the final mold solid model and high-fidelity simulation model, performing the actions detailed in steps 144, and portions of step 146 of FIG. 1A and step 222 of FIG. 1B but with all actions previously described as performed by the user now performed by the module. For example, the automated gating module may read the optimized casting parameters 850 and the engineering model input in step 920 into the workstation memory 626, and then cause the CAD/CAE software 810 to modify the model as in step 146 including adding gating features and positioning the part relative to the mold. The automated gating module may then write the resulting high fidelity model to the workstation storage 624. The resulting high-fidelity simulation model is then input by the executive software wrapper to the first stage 934 of the high fidelity simulation. Exemplary stage 934 comprises steps 222 through 230 of FIG. 1B but with all actions previously described as performed by the user now performed by the executive software wrapper. For example, the executive software wrapper may cause the solidification modeling software 814 to generate a finite mesh representation of the high fidelity model and produce the necessary simulation run files 836. The executive software wrapper may then transfer the simulation run files 836 to the HPC system 610 (data 722) and submit the simulation run to the HPC batch queue as in step 228. The executive software wrapper may then transfer the result data 724 from the HPC system to the workstation using the workstation I/O via the WAN or LAN and execute the defect metric generation script 834C. The resulting defect metric outputs of the first stage are used by the executive software wrapper in a metric evaluation step 942. For example, the executive software wrapper may collate the defect risk predictions 844 generated in the high fidelity simulation stage 934 and use an algorithm to compare it to acceptable bounds as defined by the engineer in step 920. If within bounds, the high fidelity CAD model generated by the automated gating module 932 are input by the executive software wrapper to a final wax mold model design routine 936. For example, the mold model design routine generates a mold design solid model suitable for input to the investment casting process as in step 146. The resulting wax mold design is fed in by the executive software wrapper parallel to the second stage 938 of the high fidelity model and to casting trials 950. For example, the second stage 938 of the high fidelity simulation may repeat the simulation and post-processing steps performed by the executive software wrapper in the first high fidelity simulation stage 934, using a final mold CAD model and casting parameters matching as closely as possible to the physical casting trials 950. The casting trials 950 may comprise the actions previously described in steps 252 and 254 of FIG. 1B, using the final mold design 936. The casting trial 950 and high fidelity simulation stage 938 results are then input by the executive software wrapper to the engineering evaluation step 924, which comprises the actions previously described in steps 320 through 326 of FIG. 1B. Positive evaluation results in product qualification 952, following the actions previously described in steps 328 and 30 for FIG. 1B. Negative evaluation is fed back by the executive software wrapper to the parameter review and adjustment step 922.

For example, the evaluation step 924 might return a negative result due to excessive occurrence of one or more casting defects in the casting trial. The executive software wrapper may cause the statistical analysis software 818 to perform a sensitivity analysis for the simulation parameters considered in the prior design of experiment step 943, with respect to the defect(s) which caused the negative evaluation result (e.g., a defect could be excessive porosity in one example). The executive software wrapper may also cause the statistical analysis software 818 to generate an n-dimensional response surface for the n defect risk predictions 844 generated in step 930. The executive software wrapper may then collate the casting trial results, the sensitivity analysis, and the n-dimensional response surface, and perform a rules-based expansion of the design of experiment step 943. For example, the executive software wrapper may select a subset of the simulation parameters which satisfy predetermined criteria for sensitivity to the defects which caused the negative evaluation, based on the sensitivity analysis (e.g., with the excess porosity example, this could involve the first several parameters (e.g., number cutoff based on marginal return) (examples discussed below) ranked by decreasing sensitivity to porosity risk).

The executive software wrapper may then use algorithmic rules to determine how the DOE bounds should be expanded (e.g., based on a combination of the curvature and slope of the response surface for the sensitive simulation parameters and the magnitude of the negative evaluation result). The expanded DOE bounds are then fed-back to the parameter review and adjustment step 922.

In the porosity example, the evaluation step 924 may return a negative evaluation due to excessive porosity defects (e.g., too many large pores measured with fluorescent penetrant) in the casting trial. The executive software wrapper may then cause the statistical analysis software 818 to generate the n-dimensional defect risk response surface and a sensitivity analysis with respect to risk of porosity defects. The executive software wrapper may then select the two (the number two having been determined above based on marginal return) most sensitive simulation parameters with respect to porosity based on the sensitivity analysis (e.g., part orientation with respect to the withdrawal direction and withdrawal velocity).

The executive software wrapper may then collate the n-dimensional response surface and the casting trial results (e.g., frequency and magnitude of porosity defects), and determine the direction and magnitude of expansion of the DOE bounds required (e.g., increasing allowable part orientation from a prior range of zero to 25 degrees to a new range of zero to 180 degrees, and reducing minimum withdrawal velocity from 8 to 6 inches per hour (e.g., a prior allowable range of 8 to 16 inches per hour to a new range of 6 to 16 inches per hour). The amount of the change in a DOE bound may be determined by the executive software wrapper responsive to the magnitude of the defect(s) and sensitivities of the particular defect(s) to the available process parameters. For example, this may involve calculating based on the magnitude of excessive porosity observed in the casting trial and the slope of the defect risk response surface with respect to part orientation and withdrawal velocity to yield expanded DOE bounds that provide a predetermined expectation of likelihood of success on the next run. Thus, a smaller departure, a greater slope, or a smaller predetermined expectation will cause a smaller incremental change in the DOE bounds.

If the evaluation step 940 produces a negative (out of bounds) evaluation, the executive software wrapper may undertake a rules-based expansion of the design of experiment step 943. This may involve the executive software wrapper causing the statistical analysis software 818 to generate an n-dimensional response surface for the n defect risk predictions 844 generated in step 930, then employing algorithmic rules to determine how the DOE bounds should be expanded in order to satisfy the evaluation step 940 (e.g. based on the slope or curvature of the response surface). A step 944 determining need for engineering review may involve the executive software wrapper comparing the expanded DOE 943 to the original DOE bounds determined in the input step 920, calculating a distance metric between the two, and comparing this distance metric to predetermined limits. In the case that the determination 944 is outside limits, the review requirement feeds back to the parameter review and adjustment step 922 otherwise feedback is to the low fidelity simulation step 930.

If the evaluation step 942 produces a negative (out of bounds) evaluation, a step 945 determines whether the bounds violation was within pre-determined magnitude limits. For example, the executive software wrapper may read the defect risk predictions 844 generated in step 934 and the operating bounds of the executive software wrapper written to the workstation storage 624 in step 920 into the workstation memory 626. The executive software wrapper may then perform a comparison (e.g., computing the norm of the difference between the defect risk predictions 844 and the bounds determined in step 920 for each defect type) of these to determine the magnitude of the out-of-bounds evaluation 942. An out of limits determination feeds back to the engineering parameter review and adjustment step 922 otherwise feedback is to the high frequency simulation first stage 934 via a step 956 for rules based revision of the high fidelity simulation parameters. This may include the executive software wrapper causing the statistical analysis software 818 to generate an n-dimensional response surface for the defect risk predictions 844 generated in step 930. The executive software wrapper may then employ an algorithm to first compare the high-fidelity simulation defect metric outputs generated in step 934 and the high fidelity simulation parameters determined in step 932 to the n-dimensional response surface, and second determine the direction and magnitude of modifications that should be made to the high fidelity simulation parameters.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline process or part configuration or system configuration, details of such baseline may influence details of particular implementations. Various hardware and software may be reallocated. For example, there may be multiple workstations used by multiple designer users and/or multiple casting engineer users. Various standard collaboration tools may allow the sharing of data or there may be manual file transfers using the file systems or storage media. Accordingly, other embodiments are within the scope of the following claims.

What is claimed is:

1. A process comprising:
a first casting modelling stage producing resulting casting parameters;
a second casting modelling stage performed using the resulting casting parameters of the first casting modelling stage and of higher fidelity than the first casting modelling stage, wherein:
relative to the second casting modeling stage, the first casting modelling stage involves: a simpler furnace model comprising a simpler geometric model of the furnace; simplification or omission of part features; coarser mesh; and
simpler geometric approximation of gating features; and
the first casting modelling stage and the second casting modelling stage are performed using one or a connected group of computer systems;
in parallel with the second casting modelling stage, a physical casting trial using the resulting casting parameters of the first casting modelling stage; and
evaluating the physical casting trial that used the resulting casting parameters of the first casting modelling stage;
in response to the evaluating yielding an unsatisfactory result:
the one or a connected group of computer systems expanding a design of experiment (DOE); and
forking back to within the first casting modelling stage to iterate the first casting modeling stage, the second casting modelling stage, the physical casting trial, and the evaluating using the expanded design of experiment; and
in response to the evaluating yielding a satisfactory result, result after the expanding the design of experiment and after the forking back, performing commercial scale production of castings using the casting parameters of the first casting modelling stage.

2. The process of claim 1 wherein:
the first casting modelling stage includes a simulation having a lower fidelity than a higher fidelity simulation included in the second casting modelling stage.

3. The process of claim 2 wherein:
the first casting modelling stage includes multiple runs of the lower fidelity simulation;
and the second casting modelling stage includes only a single run of the higher fidelity simulation.

4. The process of claim 2 wherein:
the first casting modelling stage includes an evaluation after the lower fidelity simulation with a negative result of the evaluation forking back to before the lower fidelity simulation; and
the second casting modelling stage includes only a single run of the higher fidelity simulation.

5. The process of claim 1 wherein:
the first casting modelling stage includes an evaluation after the lower fidelity simulation with a negative result of the evaluation forking back to before the lower fidelity simulation; and
the second casting modelling stage includes only a single run of the higher fidelity simulation.

6. The process of claim 5 wherein:
the forking back is to a point dependent on the physical casting trial, second casting modelling stage, and first casting modelling stage; and
the forking back leads to repetition of the second casting modelling stage and the physical casting trial.

7. The process of claim 5 wherein:

the forking back causes the first casting modelling stage to run with an expanded process parameter range relative to the prior run; and the expanded process parameter range is created algorithmically by a rules-based modification of a prior run process parameter range.

8. The process of claim 7 wherein:

the rules-based modification of a prior run process parameter range expands the process parameter range based on a magnitude of the unsatisfactory result and one or more associated process parameter sensitivities.

9. The process of claim 5 wherein:

the forking back is to a point dependent on the nature of the unsatisfactory result.

10. The process of claim 9 wherein:

the first casting modelling stage includes running a solidification model;

in response to a first said unsatisfactory result, the forking back is to a point after the solidification model; and in response to a second said unsatisfactory result, the forking back is to a point before the solidification model.

11. The process of claim 5 wherein:

the first casting modelling stage includes running a solidification model;

the first casting modelling stage includes a determination of variables and regions of interest; and the forking back is to a point after the solidification model but at or before the determination of variables and regions of interest.

12. The process of claim 5 wherein:

the first casting modelling stage includes running a solidification model;

the first casting modelling stage includes an optimization and sensitivity analysis of defect risk; and the forking back is to a point after the solidification model but at or before the optimization and sensitivity analysis of defect risk.

13. The process of claim 1 wherein:

the first casting modelling stage includes running a solidification model;

the first casting modelling stage includes an optimization and sensitivity analysis of defect risk; and the forking back is to a point after the solidification model but at or before the optimization and sensitivity analysis of defect risk.

14. The process of claim 1 wherein, relative to the second casting modeling stage, the first casting modelling stage involves one or more of:

omission of a casting
core; lower part count
per mold; smaller run
time; and fewer
iterations.

15. The process of claim 1 wherein, relative to the second casting modeling stage, the first casting modelling stage involves simplistic approximation of gating features.

16. The process of claim 1 wherein:

the evaluating comprises comparing results of the second casting modelling stage with results of the physical casting trial; and the comparing comprises determining presence in the physical casting trial of defects not predicted by the second casting modelling stage.

17. The process of claim 1 wherein:

the evaluating includes the one or a connected group of computer systems:

determining need for engineering review by:

comparing the expanded DOE to original DOE bounds;

calculating a distance metric between the expanded DOE and the original DOE bounds; and comparing the distance metric to predetermined limits.

18. The process of claim 1 wherein:

the one or a connected group of computer systems comprises one or more servers and one or more workstations; and the one or more servers and one or more workstations have respective scripting language interpreters running respective scripts configured to:

compute simulation parameters corresponding to experimental points spanning a process parameter range;

execute simulations according to the computed simulation parameters;

analyze the relative risk of defects predicted by each executed simulation; and perform an optimization and sensitivity analysis of defect risk in order to determine optimized casting process parameters.

19. The process of claim 1 wherein:

for each iteration of the physical casting trial, a 3D printer prints a wax pattern using the casting parameters;

for each iteration of the physical casting trial, a shell line robot shells the wax pattern using the casting parameters to form a mold; and for each iteration of the physical casting trial, a casting furnace casts using the casting parameters.

* * * * *